United States Patent [19]

Erlenbach

[11] 3,837,769
[45] Sept. 24, 1974

[54] APPARATUS FOR THE MANUFACTURE OF MOLDED ARTICLES OF FOAM-FORMING THERMOPLASTIC SYNTHETICS

[76] Inventor: Hans Erlenbach, 5429 Lautert, Rhein-Lahn-Kreis, Germany

[22] Filed: Nov. 20, 1972

[21] Appl. No.: 307,847

[30] Foreign Application Priority Data
July 29, 1972   Germany............................ 2237397

[52] U.S. Cl................... 425/4 R, 165/61, 425/243, 425/817
[51] Int. Cl............................................ B29d 27/04
[58] Field of Search............ 165/48, 61; 425/4, 243, 425/384, 817, DIG. 110, 420; 249/79, 81; 264/51, 50

[56] References Cited
UNITED STATES PATENTS

| | | | |
|---|---|---|---|
| 2,114,316 | 4/1938 | Randel | 165/61 X |
| 3,235,908 | 2/1966 | Thompson | 425/4 |
| 3,315,313 | 4/1967 | Steigman | 425/420 X |
| 3,424,827 | 1/1969 | Galizia et al. | 264/51 |
| 3,505,435 | 4/1970 | Schmidt | 425/4 X |
| 3,768,552 | 10/1973 | Ciraud | 425/429 X |

Primary Examiner—R. Spencer Annear
Assistant Examiner—Mark Rosenbaum
Attorney, Agent, or Firm—Strauch, Nolan, Neale, Nies & Kurz

[57] ABSTRACT

Apparatus for molding articles of foam forming thermoplastic synthetics wherein the mold assembly has separate and independently controlled systems respectively for heating and cooling the mold walls and for injecting steam during the foam forming operation, and in one embodiment the same heat transfer liquid is selectively circulated through heating and cooling devices in the system for heating and cooling the mold walls, including preheating of the mold walls prior to introduction of the plastic in a variation of this embodiment.

26 Claims, 5 Drawing Figures

APPARATUS FOR THE MANUFACTURE OF MOLDED ARTICLES OF FOAM-FORMING THERMOPLASTIC SYNTHETICS

The invention relates to apparatus for manufacturing molded articles of foam-forming thermoplastic synthetics, where the synthetic preferably is introduced in granulated form into the mold and will be molded under the influence of steam introduced in the mold inner chamber while being caused to foam, and where the mold is provided with walls that can be heated and cooled and also with arrangements for supplying steam to the mold center chamber.

Known devices of this kind comprise a divided mold receiving the synthetic in granulated form and equipped with chambers on their external walls through which steam is introduced during the foaming-and-molding process in order to heat the mold walls. In order to cool the latter following foaming and molding and so as to provide the required solidity to the manufactured molded article as regards ejection, cold water is fed into the chambers mounted on the outer mold walls (see German Auslegeschrift Pat. No. 1,152,248).

These known devices function very slowly. They further suffer from the drawback that even heat distribution on the mold walls heated from the chambers requires applying steam into the chambers at relatively high pressures and therefore the mold walls must be able to withstand appreciable forces and accordingly must be relatively bulky. Despite fairly high-pressure steam application in these known devices, there remains insufficient reliability that air pockets will be avoided in the chambers that will prevent parts of the mold walls from being sufficiently covered with steam and from being sufficiently heated. When cooling the mold walls, that is, when introducing cold water into the chambers, the steam present there will condense very rapidly and appreciable under-pressure is generated in the chambers, which together with the over-pressure generated in the molded article must be absorbed by the mold walls. On all these grounds, known devices make it indispensable that the mold walls be massive and highly stress-resistant. Consequently, construction of mold walls entails expensive apparatus and methods, and relatively complex molds with the required wall-strength or simply cannot be made with the required rigidity.

In the above-described devices steam is directly introduced into the mold center chamber, and this is achieved by feeding it from the heating chambers through passages in the mold wall, for example perforations or air nozzles, which may be controlled or not (see DER PLASTVERARBEITER, 1954/9, pp 264–265) as regards an uncontrolled supply; and defective spots may be caused on the surface of the molded article because the steam entering the mold center chamber through the above passages will usually condense on the initially cool mold wall, or, if water is being used, on account of the hot water being introduced in uncontrolled manner, and such defects will be particularly pronounced in the thin-wall areas of the molded articles because hot water drops or condensation water drops will strongly hamper even spreading of the synthetic where the mold will be tight. It is true that when there is valve control, the mold walls may be sufficiently preheated before supplying steam from the outer chambers into the mold center chamber (see German Offenbarungsschrift Pat. No. 1,504,957). However, these externally controlled transition valves located in the heating chambers represent an additional complexity as regards the mold and further are susceptible to interferences, since they are being bathed by cooling water during the cooling process; residues of the cooling water remaining at these valves even when the mold walls are being steam-heated, and these residues will be flushed into the mold center chamber when the valves are opened, together with the steam. While condensed water in the mold center chamber is thus being avoided, the presence of the equally objectionable cooling water residues being carried in with the steam is unavoidable. Thus the known devices are only suited for the manufacture of relatively simple molded articles on two grounds, namely, first the high rigidity requirements placed on the mold walls, and second the particularly interfering water transfer into the mold center chamber when dealing with complex molds.

All known processes and devices of the kind described above suffer from the fundamental drawback due to steam being used as the heating substance, from the relative restriction in mold wall operating temperatures and from the danger of water transfer into the mold center chamber due to the introduction of fairly wet steam.

The invention on the other hand addresses itself to the task of providing a device allowing appreciably higher mold wall operating temperatures while also affording reliable and even heat transfer even when complex shapes are involved and further avoiding water transfer into the mold center chamber.

This task is solved by the invention in providing an independent heating and cooling system for the heat-or-cold transfer substance heating or cooling the mold outer walls and in providing a steam source and a supply control for the steam to be introduced into the mold center chamber which is separate from the heating-and-cooling system of the mold walls. In this manner, the feasibility is provided for optimum adaptation of mold wall temperatures to the particular applications, and especially so even if the mold walls are of relatively complex shape. The steam generated independently of mold walls' heating and cooling system may be reliably supplied as dry steam to the mold center chamber and therefore may more effectively influence in a favorable sense the foaming and the shaping of the synthetics placed into the mold. A further appreciable advantage of the invention consists in the virtually independent controls of mold wall temperatures and of the temperature of the steam to be introduced into the mold center chamber and they may therefore be optimally selected with respect to one another, for instance as regards material properties and mold characteristics.

The invention eliminates any kind of condensation in the mold center chamber and in the heating and cooling chambers. Preferably a liquid heat-transfer substance, particularly a heat-resistant oil, will be used within the scope of the invention, so that deposits such as calcium are avoided. The operational rate of the device may be appreciably heightened. The entire control system of the device, particularly with respect to the temperatures of the heating and cooling substances and that of the steam to be introduced into the mold center chamber, may be appreciably improved. A preferred mode of execution provides for a supply chamber and a distribution chamber for the steam to be introduced in the mold center chamber which are independent of the chambers formed in the mold walls for the heating and cooling substances, where the steam distributing chamber is in constant communication with the mold center chamber at a location previously determined by the shape of the molded article, and where the supply control for the steam to be introduced into the mold center chamber contains a valve chronically open during operation and actuating steam transfer from the steam supply chamber to the steam distribution chamber. This arrangement eliminates mounting the steam supply valves immediately at the steam intake to the mold center chamber. Instead, according to the invention, the steam distribution chamber provides an additional steam manifold between the plurality of steam intakes to the mold center chamber and the valve for steam supply control.

Though at first one might expect that the introduction of such a steam manifold no longer allows simultaneous steam supply to the various locations of the device of the invention, it has been surprisingly observed that operation of the additional steam manifold together with the steam supply chamber has allowed more precise and more reliable control of the steam supply to the mold center chamber. Of particular and main advantage in this respect is the fact that only one single valve is required for controlling the steam supply in the presence of a more or less appreciable number of steam intakes, and furthermore that this steam supply control valve may be mounted such a distance away from the mold center chamber that no reaction on the valve from the material to be molded is possible. Any kind of damaging effect from steam condensation is also eliminated by mounting the valve between the steam supply chamber and the steam distributor chamber. So much energy is stored as heat in the area of the steam supply control valve that condensation is out of the question and that furthermore this valve no longer is a function of the critical specifications and dimensions determined by the mold wall, and any condensation that might arise at the valve would be caught by the steam distributor chamber and rendered harmless. This mode of execution therefore provides the feasibility of optimally adapting the temperature of the steam to be introduced into the mold center chamber to the particular material being processed and for operating closely to the wet steam range, if this should be necessary.

With respect to this preferred embodiment of the invention, the steam distributor chamber may also be provided with an additional exhaust orifice controlled by a valve which is temporarily opened during operation of the device. This exhaust orifice may be controlled in such fashion that there are additional exhaust channels across the steam intakes and steam distributing chamber while the mold is filled with work material. On one hand this achieves an appreciably improved spreading of the material within the mold and on the other hand this ensures that the steam intakes are blown through reversely during each filling process. This achieves dry conditions at the steam intakes to the mold and at their orifices at the mold inside surface.

Furthermore with respect to this preferred embodiment of the invention, the steam distributing chamber may be provided with an additional ventilation orifice connected to a compressed air source and controlled by a valve temporarily open during operation of the device. In this manner a particularly simple and effective possibility is provided for making use simultaneously of the steam intakes of the mold for the ejection of the molded article. Because the steam intakes of the mold as a rule represent the critical areas of the mold in view of the shape of the desired article, it is particularly advantageous that the exhaust mechanisms be allowed to act at those locations. The possibility therefore is also provided for removing the molded articles from the mold ahead of time, whereby the device's output is appreciably increased. Further, the steam intakes to the mold center chamber are blown through during each ejection process and they are therefore kept free from condensed steam and synthetic work material residue. The blowing-in of cold ejection air to the steam distributing chamber entails no damages to the steam supply because the steam distributing chamber and the steam supply lines to the mold center chamber were sufficiently heated by the mold wall heating system prior to introducing the steam. If the steam intakes and the steam distributing chamber are additionally made use of for ventilating the mold during material insertion, pre-heating already will be achieved by means of the heated air escaping from the mold center chamber by way of the steam intakes and the steam distributing chamber.

According to another embodiment of the invention, controls for the heating and cooling systems of the mold walls may be provided by means of which the mold will be preheated to about 150°C with a liquid heat transfer substance before the synthetic material is introduced. Previous devices for the manufacture of molded articles of foam-forming, thermo-plastic synthetics required mold walls that were relatively thick and massive in order to safely absorb the temporary over-pressures in the heating and cooling chambers and the also the temporary under-pressures, and to compensate somewhat by means of heat conduction inside the mold walls for interferences due to air bubbles caused by heating in the heating-and-cooling chambers.

These drawbacks may be avoided in this second embodiment of the invention by so constructing the mold walls and the chambers on the external side of the mold walls, and also the control mechanisms, that they will transmit the liquid heating substance without being subjected to pressures and by forming into a separate system the steam intakes to the mold center chamber as regards the cooling and heating chambers. It will be advantageous that the components of the heating and cooling mechanisms making up the mold walls be thin-walled and of a good thermally conducting material, particularly a metal, and that the remaining components of the heating and cooling chamber walls be solid in view of their support functions and of a thermally insulating material, such as glass-fiber reinforced resin. Because of the practically pressure-free transfer of the liquid heating or cooling substance, the relatively thin-walled mold wall components will not be adversely affected. The liquid heating or cooling substance furthermore bathes the outer surface of the mold wall components appreciably more intensively and more evenly than is possible with steam and a more rapid and more even heat transfer is thus achieved. The thin-walled construction of the mold walls together with the simultaneous bething in a heating or cooling substance further allow providing mold walls of relatively complex shapes so that virtually any kinds of molded articles, even those of difficult complex forms, may be manufactured. By further constructing the remaining components of the heating and cooling chambers as supports of thermally insulating material, a particularly desirable thermal efficiency has been achieved for the mold as a whole. With respect to known devices, the heat capacity of the entire mold according to the invention is appreciably less, so that the mold reacts much faster to the temperature of the heating or cooling substance being applied and thereby allows appreciably larger outputs.

BRIEF DESCRIPTION OF DRAWINGS

Referring to FIG. 1, associated similar separable mold member halves M and M' are formed with opposed spaced relatively thin good heat conducting metal walls 1 and 1' defining between them a mold central chamber 10 of desired shape and size into which granular or like fluent synthetic plastics material to be formed into the shape defined by walls 1 and 1' is adapted to be injected by suitable known mechanism (not shown) connected to a passage 7 in mold member M'.

Figure 1:
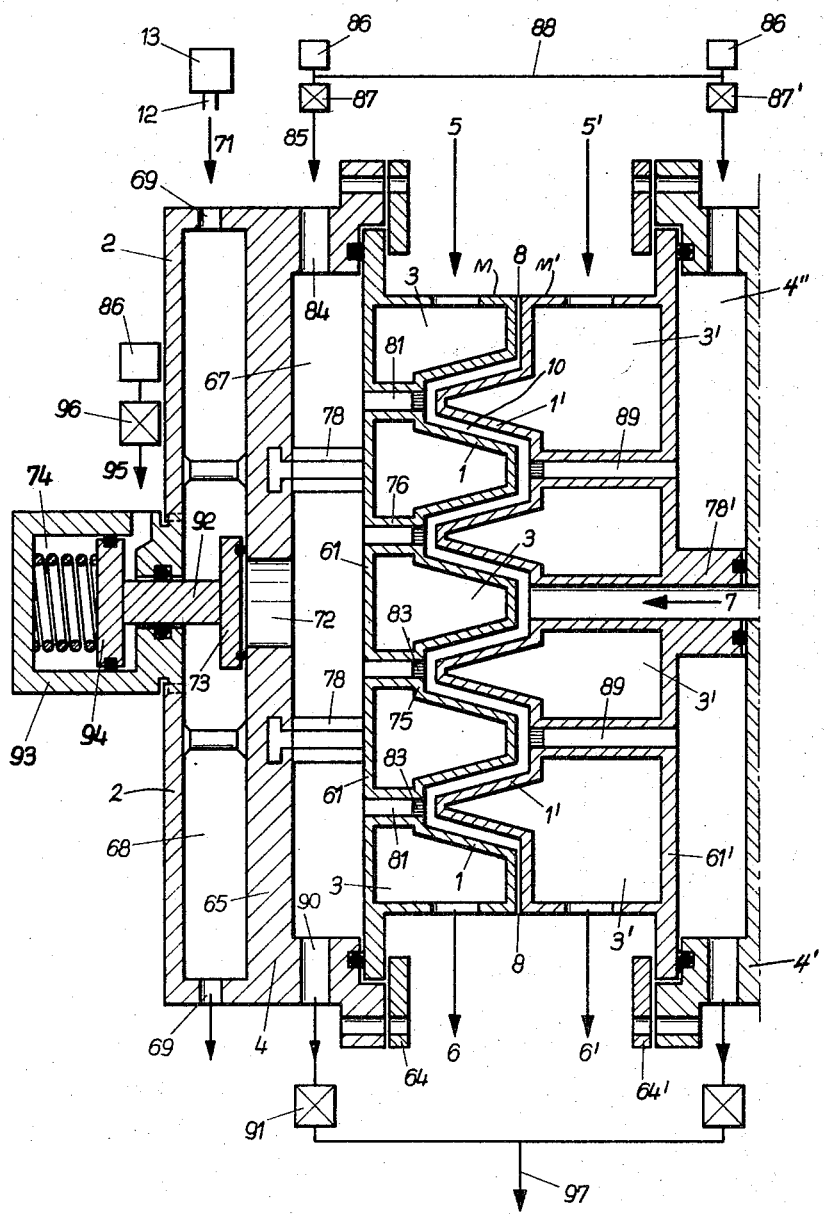
FIG. 1 is a sectional view taken through the molding tool of a device according to a first embodiment of the invention, showing a partly diagrammatic representation of steam injection control.

Mold members M and M' are formed with heat exchange chambers 3 and 3' respectively that are located at the back sides of walls and 1 and 1' respectively and are selectively supplied with heat exchange fluid by control of the fluid supply systems 5 and 5' as will appear for selectively heating and cooling the mold members.

Mold members M and M' are mounted upon support housings 4 and 4' respectively, one of these housings containing steam introduction and control arrangements for the controlled supply of steam for the foam forming operation from an external steam generator 13 to mold central chamber 10.

The system for supplying steam to mold central chamber 10 is thereby independent of the systems for heating and cooling the walls 1 and 1' of that chamber.

FIG. 1 shows the mold half comprising member M secured on housing 4 provided with arrangements for injecting steam into mold central chamber 10. Housing 4 has a partition wall 65 separating it internally into a steam supply chamber 68 and a steam distribution chamber or manifold 67. Mold member M has a straight side wall 61 that is spaced from wall 1 and extends across and forms one side wall of chamber 67, and wall 61 is seated at its ends in a recess in the wall of housing 4 to which it is removably attached as by flange 64. Wall 61 thereby hermetically seals chamber 67 at that side except for steam passages 81 to be described.

The other mold half comprises mold member M' removably mounted on a housing 4' as by a flange arrangement 64' similar to that at the opposite half. Housing 4' contains an internal chamber 4'' closed by wall 61' common with mold member M' for a purpose to appear. The internal heat exchange chambers 3 and 3' of the respective mold members may be connected to the same hot and cold fluid supply system, or to different similar systems as at 5, 5'. Chambers 3 and 3' are connected to respective exhaust or drain systems 6 and 6'.

Partition wall 65 of mold member M is located approximately in the center plane of housing 4, this partition being hermetically spaced from the outer end wall 2. Thus steam distribution chamber 67 extending over the entire rearward surface of the mold member M between wall 61 and partition 65 is formed, and a steam supply chamber 68 is provided between partition 65 and wall 2.

There is at least one steam intake bore 69 entering the steam supply chamber 68 in housing 4. Two steam supply line orifices 69 and 69' are shown in the drawing, one of which is connected to a condensation eliminator. The steam supply line 12 from steam generator 13 is connected to steam intake orifice 69, as indicated by arrow 71. A bore 72 acting as a connecting orifice between steam supply chamber 68 and steam distribution chamber 67 is located in the center of partition 65. This bore 72 may be closed by a valve disc 73 which is part of the steam control valve 74 further described below.

Mold wall 1 as illustrated is shaped for the manufacture of egg-packing containers. Therefore mold wall 1 comprises a complex shape having a more or less large number of projecting parts 75 extending into and between the heating and cooling chambers 3. Connecting passages 81 lead from chamber 67 into these inward projecting mold wall parts 75 and they represent a hermetic connection between steam distribution chamber 67 and mold center chamber 10 through mold wall 1 and wall 61. A steam injection nozzle 83 is mounted in each passage 81 at the end facing the mold central chamber. The mold wall 1 and wall 61 are both mounted in precisely opposite spacings on the appreciably stronger partition wall 65 as by spacers 78 extending between them. Partition 65 remains at a practically constant temperature because of the steam constantly present in steam supply chamber 68, whereas wall 61 and mold wall 1 will be subjected to strong temperature variations in the course of the operation of the device because of alternating heating and cooling. Thus, by means of spacers 78, partition 65 is essentially the support for the precisely set wall 61 and mold wall 1 and hence mold member M.

Housing 4 is provided with an intake bore 84 at steam distributing chamber 67. Bore 84 is connected to a compressed air line 85. A valve 87 controlled in the course of the operation of the device is inserted into line 85 that is connected to compressed air source 86. A branch line 88 is derived via a valve 87' by means of valve 87 from compressed air line 85 in the example shown, leading to chamber 4'' and an annular ejection passage 89 surrounding the material injection mechanism in housing 4' and if necessary leading to further ejection mechanisms in the second molding tool half.

There is also a vent 90 in housing 4 at steam distributing chamber 67, to which is fastened an exhaust valve 91 controlled during the operation of the device, exhaust valve 91 providing for effective ventilation of the mold center chamber and of steam distribution chamber 67 by means of vacuum pump 97.

A steam control valve 74 is mounted in the steam supply chamber. The activation mechanism for this control valve 74 is mounted on the rear of wall 2 the steam supply chamber. Shaft 92, supporting vavle disc 72, extends through wall 2 into steam supply chamber 68. The activation mechanism indicated by arrow 95 and provided with a cylinder 93 and a spring biased piston 94 is controlled by a pilot valve 96 actuated from the control mechanism of the device and by compressed air source 86.

Starting from the machine control, and acting via the pilot valve 96, valve disc 73 will be kept part of the time in open position, that is, withdrawn from bore 72, so that the steam from steam supply chamber 68 may practically pass on unhampered into steam distributing chamber 67.

Operation of the apparatus of FIG. 1 essentially is as follows:

During or after sealing the empty mold, the first step consists in initially heating the mold walls 1 and 1'. This is done by introducing a heating fluid such as steam, water or oil through passages at 5 and 5'. Then ventilating valve 91 will be opened and suitable pneumatically functioning mechanism at 7 for synthetic material introduction will be actuated to inject the material into chamber 10. Simultaneously the mold central chamber 10 is ventilated along its peripheral edge at small slits 8 and especially also through passages 81, 89 and ventilating valve 91. Introduction of the material displaces air toward valve 91.

When the mold central chamber 10 has been filled with the required amount of synthetic material, ventilating valve 91 and material introduction mechanism 7 will be closed. Then steam control valve 74 which has been biased to close bore 72 is opened in order that the water vapor present in steam supply chamber 68 and the pressure of which has been made to correspond to the granulated substance to be molded will displace through bore 72 into steam distribution chamber 67 and from there through passages 81 into the mold central chamber 10 at the desired locations. The duration of steam admission will be selected according to the synthetic material to be processed and other peculiarities such as foam forming concerning formation of the molded article. Upon termination of this period of steam admission, the steam control valve will be closed. It is important, also during the foam-forming process, that the small air slit 8 remain open at the peripheral edge of both mold halves, so that the expanding air may leak off. Ventilation grooves may be provided at the mold edge or adjustable spacers may be mounted on one mold half in order to adjust the size of the air slit. Following termination of the pre-selected foaming period, the heating and cooling system of heating and cooling chambers 3, 3' will be switched to cooling, as by shutting off entry of heating fluid at 5, 5' and introducing cooling fluid such as water through these systems into chambers 3 and 3'.

A predetermined cooling period ended, the mold will be opened and thereby a pneumatic ejection system will be activated. To that end, one may first selectively open valve 87, so that compressed air from generator 86 enters steam distribution chamber 67 via line 85 and from these passes through passages 81 to the molded article, expelling the molded article from the one mold half M while the other mold half is being removed. Then valve 87' will be actuated, so that following the opening of the mold, the molded article will also be ejected from the second mold half. However, the inverse control sequence too is conceivable, whereby removing the second mold half followed by opening the mold will result in ejection from the first mold-half. Lastly one may also conceive of opening both valves 87 and 87' simultaneously so that the molded article would be detached from both mold-halves when opening the mold and would fall out of it as the mold would be opened.

Besides a pneumatic ejection mechanism, one may also make use of a mechanical ejection mechanism in that half of the molding tool which lacks the steam intake to the mold central chamber, the ejectors being mounted in passages 90 and additionally provided with bores for the purpose of ventilating the mold central chamber.

Figure 2:
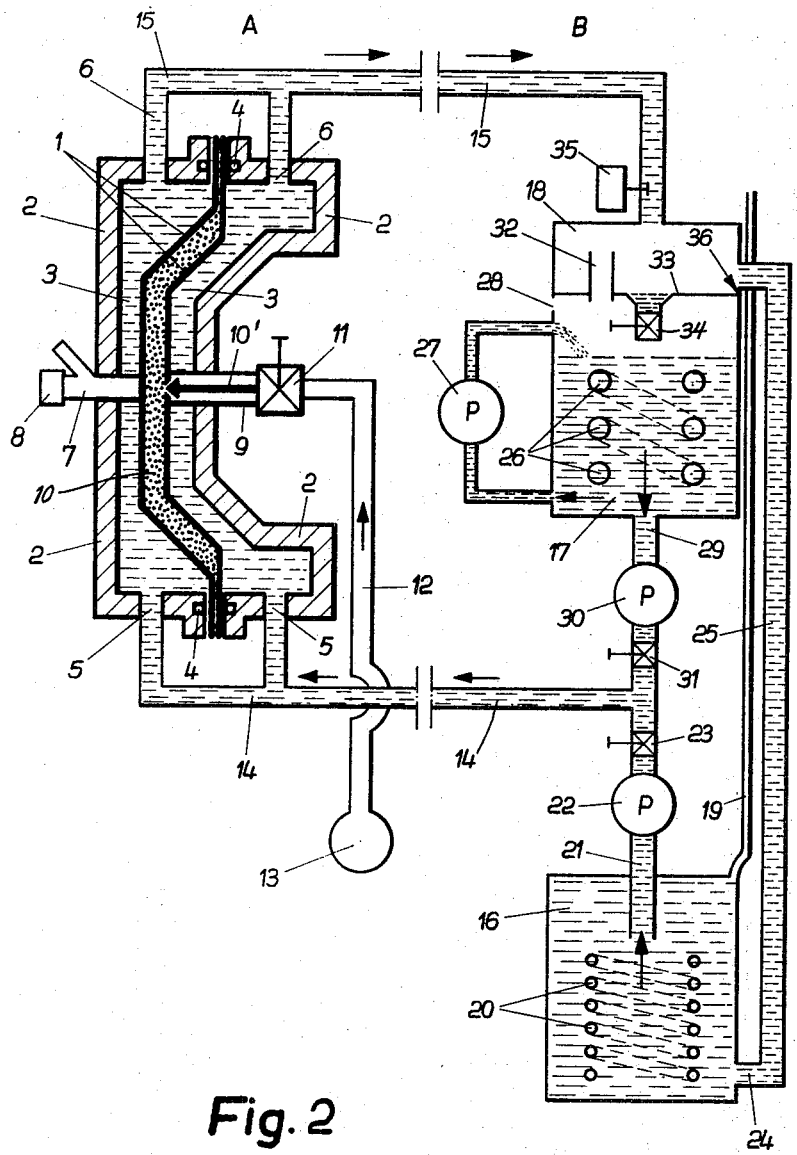
FIG. 2 is a diagrammatic assembly view of the device in a second embodiment, part A designating the mold proper, and part B designating the mechanisms supplying and separating the heating and cooling substances.

As shown in part A of FIG. 2, this embodiment provides a mold with thin mold walls 1 which may be manufactured by means of metal processing or by means of galvanic layer construction if complex shapes are involved. Mold walls 1 are mounted on outer support walls 2 made of glass-fiber reinforced, thermosetting synthetic resin, for instance melamine, epoxide or phenol resin for heat insulation. Heating and cooling chambers 3 are provided between support walls 2 and mold walls 1, made hermetic at the periphery of mold walls 1 and support walls 2 as by seals 4. The heating or cooling chambers 3 are provided with supply lines 5 and drains 6 for a liquid heat-transfer substance such as heat resistant oil. Heating and cooling chambers 3 further are provided with deflection mechanisms (not shown) feeding the pressure-free, liquid heat transfer substance into all areas of chamber 3 by means of a stream passing through the same, so that the mold walls 1 will be bathed evenly on their external sides by the liquid heat transfer substance flowing through chambers 3.

As also shown in part A of FIG. 2, the mold may comprise two parts. The left mold part of FIG. 2 supports a passage 7 for injecting a synthetic granulate and controlled by means of valve 8 connected to a known form of injecting mechanism.

The right hand mold part in FIG. 2 is provided with a mechanism for injecting steam into the mold center chamber 10. This mechanism is provided with an adjustable needle valve 10' for setting the amount of steam to be injected, which is located in an intake tube 9 extending from the external side of mold wall 1 through chamber 3 and support wall 2. Steam injection tube 9 is connected to steam supply line 12 via a valve 11 actuated by the central operational control of the device. This steam supply line is derived from an independent steam generator 13 separate from the heating and cooling system for chamber 3 and is constantly generating dry steam to be supplied via valve 11 through line 12.

Figure 3:
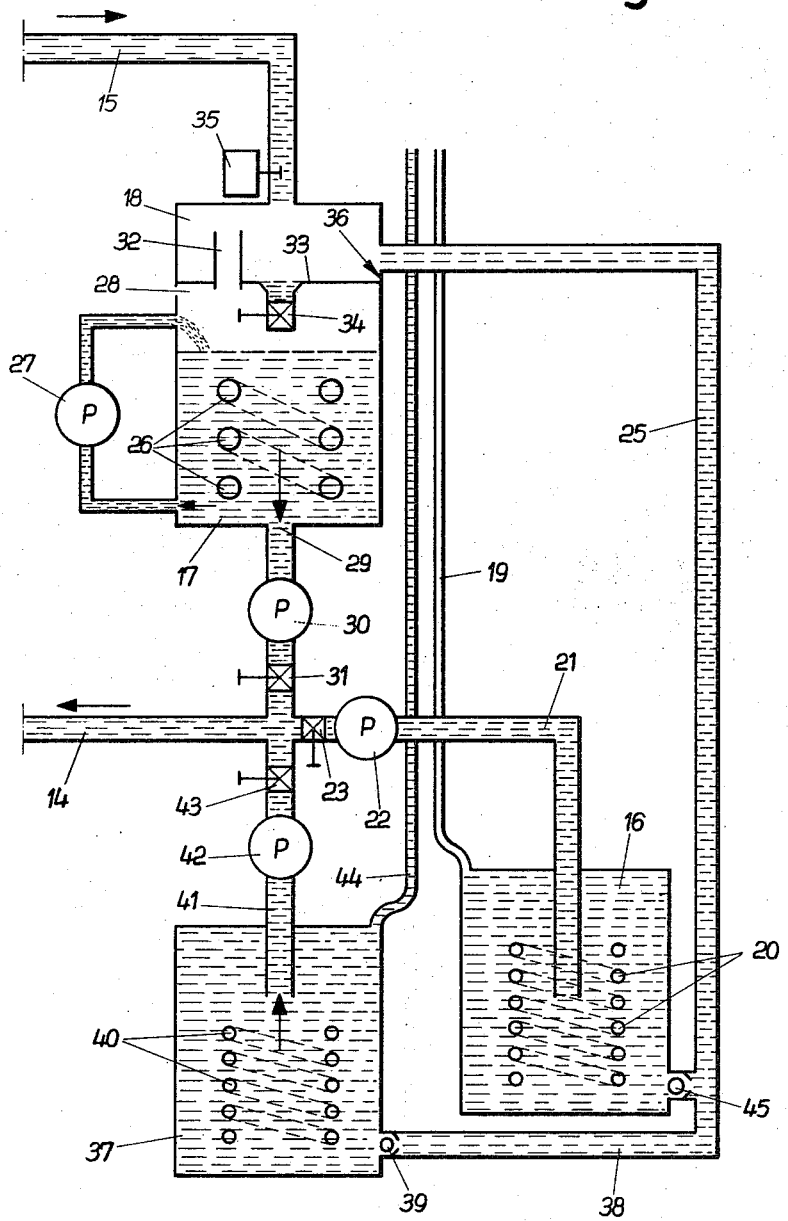
FIG. 3 shows a modified form of part B of the diagrammatic showing of FIG. 2.
Figure 4:
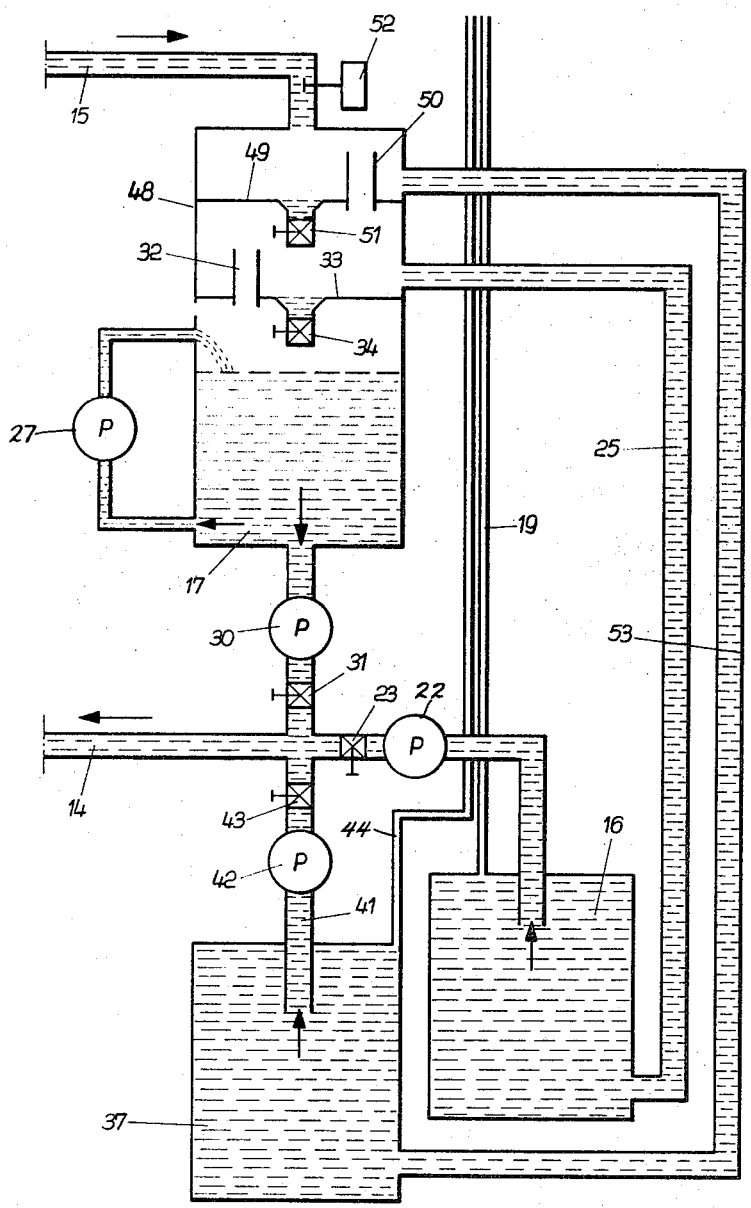
FIG. 4 shows a further embodiment of part B of the diagrammatic showing of FIG. 2.

Intakes 5 provided in support walls 2 are connected by a supply line 14 to a heating and cooling system, and the exhausts 6 also provided in support wall 2 are connected by a return line 15 to the heating and cooling system, as shown in part B of FIG. 2, or in FIGS. 3 and 4.

Part B in FIG. 2 illustrates a twin liquid circulation system in which the same liquid heat transfer substance is used as a heating and cooling substance. This twin liquid circulation system comprises a heat container or reservoir 16 and a cooling container or reservoir 17 for the liquid heat transfer substance and also a separation arrangement at 18 for cold and hot liquid substances. Heat container 16 is closed and provided with a vent line 19. A heater 20 is mounted within or around heat container 16 and is controlled by a thermostat (not shown) in order to maintain the substance contained in vessel 16, for instance oil, at a predetermined temperature. An exhaust pipe 21 penetrating about one-third deep of the entire height of contained liquid is mounted on the upper side of heat container 16 and supports a pump 22 which may run continuously. A valve 23 is mounted at the outlet of pump 22 and actuated from the central control mechanism of the device, and connected at its exhaust side to supply line 14. Intake 24 of heat container 16 is located at the lower container region as shown and connected by means of an intake line 25 to the separation arrangement 18 for hot and cold heat transfer substances.

Cooling container 17 comprises a cooling coil 26 and a constantly operating liquid circulating system with pump 27. Cooling container 17 is provided with a vent 28 at the top and with an outlet 29 into pump 30 which may be continuously operating and is connected via the latter to a valve 31 and thereafter, just as heat container 16, to supply line 14. The inflow to cooling container 17 on one hand takes place directly through an overflow 32 from the separation arrangement 18 located above cooling container 17 and used for hot and cold heat transfer substances, and indirectly via a valve 34 mounted in the bottom 33 of separation arrangement 18 and actuated from the central control mechanism of the device and from a temperature sensor 35 inserted in the return flow line 15.

Connecting pipe 25 between separation arrangement 18 and heating container 16 however is connected to the lateral wall of separation arrangement 18 in the region of its bottom 33 and at a preselected spacing above said bottom.

Operation of the apparatus according to FIG. 2 is as follows:

When mold 1, 2 is open, valve 23 will be opened by the central control mechanism so that hot liquid heat transfer substance will be supplied to the chambers 3 and so that any previously present cold heat transfer substance will be displaced and drained through return flow line 15 into separation arrangement 18 and through now open valve 34 into cooling container 17. After moments the hot heat transfer liquid reaches a predetermined temperature as noted by sensor 35, the latter shuts valve 34 and the hot heat transfer substance will flow back via line 25 into the heating container 16, where, on account of vent 19, the liquid level at this stage is slightly higher than the lower end of exhaust pipe 21. Circulation of the hot heat transfer substance via pump 22, valve 23, supply line 14, chambers 3, return flow line 15 and reflux line 25 at first will be maintained while the mold is being shut and injected with granulated synthetics by means of mechanism 7, 8, the mold being mostly closed. Then the mold will be shut completely and valve 11 will be opened by the central control mechanism of the device, so that steam for foam forming will be supplied via line 12 of the injection mechanism 9, 10' into the mold central chamber 10. This switching condition of the device is preferably maintained by a time switch until the synthetic has been made to foam and has been made to assume the desired shape.

Upon termination of the set molding time, or shortly before, valve 11 of the steam injection mechanism 9, 10 will be closed. After termination of the set molding time, the central control mechanism of the device also closes valve 23 and opens valve 31 to switch over to mold cooling. Henceforth the continuously operating circulation pump 30 conveys cold heat transfer substance from the cooling container 17 through supply line 14 into heating and cooling chamber 3 and from there through return flow line 15 into separation arrangement 18. First the hot heat transfer substance will be expelled from chambers 3 and it will be made to flow through the line 25 until heating container 16 is entirely filled. When heating container 16 is completely filled, the further liquid, partly still hot, but also partly already cold, will gather above bottom 33 of separation arrangement 18 until it will recede into cooling container 17 via overflow 32.

As soon as the molded article is sufficiently firm, the mold will be opened and the molded article will be ejected. Simultaneously with opening the mold, the central control mechanism of the device opens valve 34 of separation arrangement 18 so that the heat transfer substance collected on bottom 33 will drain off into cooling container 17. Valve 31 will be closed and valve 23 will be open shortly before ejection or during ejection of the molded article from the mold, so that heating of the latter resumes at once. The inevitable mixing of parts of hot and cold heat transfer substances during the above operational sequence is of no significance since the liquid substance is the same in both cases and because the additional amount of heat introduced in this manner into cooling container 17 is negligibly small compared to the amount introduced by the cooling process. Furthermore, the heat loss caused by introducing small amounts of cold substance into heating container 16 is also negligibly small in comparison with the amount of heat required for raising the temperature of the mold and for causing the synthetic to foam and for molding it.

If the device's operational sequence is to be further accelerated, the mold in the open state may be first preheated with the hot heat transfer substance and then be raised to a temperature compatible with the synthetic during the foaming and molding process proper and finally be cooled following the foaming and molding process. A triple liquid circulation system capable of executing such functions is shown in FIG. 3 which illustrates modified part B of FIG. 2, the structure and mode of operation of associated part A of FIG. 2 being unchanged.

Also, cooling container 17 and separation arrangement 18 for hot and cold heat transfer substances as well as temperature sensor 35 are constructed and operated in the same manner as in part B of FIG. 2.

Therefore the same reference numerals are used for those components of the device.

In contrast to the device according to part B of FIG. 2, the example of FIG. 3 shows a heating container 16 with a heat transfer substance raised to operational temperature and an additional heating container 37 with a heat transfer substance raised to somewhat higher temperature for the purpose of preheating, which are connected in parallel to transmission line 25. The latter leads to a branch line 38 with a back-pressure valve 39, so that heat transfer substances may be supplied to the additional heating container 37 but the reverse passage of heat transfer substance from the additional heating container 37 into the transmission line 25 will be prevented. Similarly to heating container 16, additional heating container 37 comprises a heating mechanism 40 with thermostat control in order to maintain the heat transfer liquid substance in heating container 37 at the desired preheating temperature, for instance 150°C. As is the case for heating container 16, heating container 37 is provided an exhaust pipe 41 penetrating from above into the inside of said container and is connected via a pump 42, which may be continuously running circulation pump, and via a valve 43 actuated by the central control mechanism to the supply line 14 which leads to chambers 3. The additional heating container 37 furthermore is provided with a vent 44.

Heating container 16 is constructed in similar manner and connected to supply line 14, as already explained with respect to part B in FIG. 2. Therefore the same components and the same reference numerals are used.

In the course of operation of the device of FIG. 3, and shortly before or shortly after ejecting the molded article, or during said ejection, the central control mechanism of the device will first close valve 31 and open valve 43, valve 34 in separation arrangement 18 being in the open state. Pump 42 then will convey very hot liquid heat transfer substance, for instance at a preheat temperature of 150°C, via supply line 14 into chambers 3 of the mold, whereby the cold heat transfer substance present there will be displaced through return line 15 and through open valve 34 into cooling container 17. Additional heating container 37 then draws somewhat less of the heated heat transfer substance from transmission line 25, while back-pressure valve 45 prevents evacuation of the heat transfer substance from heating container 16. As soon as the hot heat transfer substance reaches a predetermined temperature detected by sensor 35, the latter will close valve 34, so that when the liquid on bottom 33 exceeds level 36, the heated heat transfer substance will flow back via back-pressure valve 39 into the additional heating container 37. If the adjusted preheating time at the central control mechanism of the device is ended, valve 43 will be closed and valve 23 will be opened, so that presently pump 22 will convey a heat transfer substance at a normal operating temperature between 110°C and 120°C from heating container 16 into supply line 14 and, expelling the hot heat transfer substance present so far, through chambers 3 and return line 15 into transmission line 25. The somewhat lower location of additional heating container 37 has been filled. Because of the lower temperature of the heat transfer substance from heating container 16, the mold will be kept to the desired temperature as long as the foaming and molding process contoinues. Other operational steps, particularly steam injection and switching to cooling until the above-mentioned initial conditions have been reached, are the same as explained with respect to FIG. 2.

As explained above for the illustration of FIG. 3, one must take into account that the lower temperature heat transfer substance will be first carried from transmission line 25 into the additional heating container 37. This however is no drawback, the additionally required quantity of heat for raising the temperature of the heat transfer substance to such a preheating temperature as 150°C being negligibly small when compared to the amount of heat required to raise the temperature of the mold. One should further consider that part of the hotter heat transfer substance will reach heating container 16. This presents no drawback either, since there will be that much less heat energy to be introduced as regards the requirements of heating container 16. It is true that the heat introduced in such fashion into heating container 16 must be fairly small with respect to the total heat required in said container, since otherwise difficulties may arise in controlling the temperature of heating container 16 to a constant value. If appreciable quantities of heat are expected to reach container 16 because of the introduction of the hotter heat transfer substance, another mode of execution of the invention may be more suitable, as explained below by means of FIG. 4 which illustrates another version of part B of FIG. 2.

The embodiment of FIG. 4 again provides a supply line 14 leading to the mold, a return flow line 15 from the mold, a cooling container 17, a first heating container 16 intended for a heat transfer substance kept at normal operating temperatures such as 110°–120°C and an additional heating container 37 intended for a heat transfer substance kept at a higher preheating temperature such as 150°C, for the liquid heat transfer medium. The three containers 16,17,37 are connected as shown in the example of FIG. 3 to pumps 22,30,42 respectively and to valves 23,31,43 respectively which are controlled from the central control mechanism. The heating and cooling mechanism proper of containers 16, 17, 37 are the same as in example of FIG. 3 and therefore have been omitted from FIG. 4 for the sake of simplicity.

In contrast to FIG. 2, the emobidment of FIG. 4 includes a double-step separation arrangement 48 above the cooling container 17. As before, the lower step of double-step arrangement 48 comprises the bottom 33 with overflow 32 and bottom valve 34. The upper step comprises a similar arrangement of an additional bottom 49, an overflow 50 and a bottom valve 51. A temperature sensor 52 located near separation arrangement 48 is mounted on return flow line 15 and is so constructed and connected as to actuate both valves 34 and 51 in concert with the central control mechanism. As shown by FIG. 4, the heating container is connected to the lower step of the separation arrangement 48 via a transmission line 25 as in the example of part B of FIG. 2, while the additional heating container 37 is connected to the upper step of separation arrangement 48 via a transmission line 53.

As already disclosed with respect to FIG. 3, operation begins with the central control mechanism closing valve 31 and opening valve 43, the mold being open, and valves 34 and 51 being in the open positions. The highly heated preheating substance from additional heating container 37 thus passes through line 34 into heating and cooling chambers 3 of the mold and displaces the cold heat transfer substance through line 15 and open valves 51 and 34 into cooling container 17. As soon as the hot heat transfer substance reaches and actuates temperature sensor 52, the latter will close valves 51 and 34, so that the hot heat transfer substance will flow back into the additional heating container 37 via transmission line 53. When the central control mechanism switches from mold heating to operational temperature heating, that is, when valve 43 is closed and valve 23 is opened, then the preheating substance displaced from the mold will be conveyed through transmission line 53 into additional heat container 37 until the latter is filled. Thereafter, the heat transfer substance from return flow line 15 will accumulate on bottom 49 until reaching the lower step of separation arrangement 48 via overflow 50 and it will then flow back via transmission line 25 into heating container 16. An additional time switch may be installed in the central control mechanism of the device, which will open valve 51 after a predetermined time, so that the hot heat transfer substance accumulating on bottom 49 may drain into the lower step of separation arrangement 48 and will pass through transmission line 25 into heating container 16. All other operational steps may be the same as discussed with respect to FIG. 1. The embodiment of FIG. 4 achieves returning as much as possible of the preheating substance to additional heating container 37 and avoiding transfer of appreciable amounts of excess heat into heat container 16 by means of the preheating substance.

Figure 5:
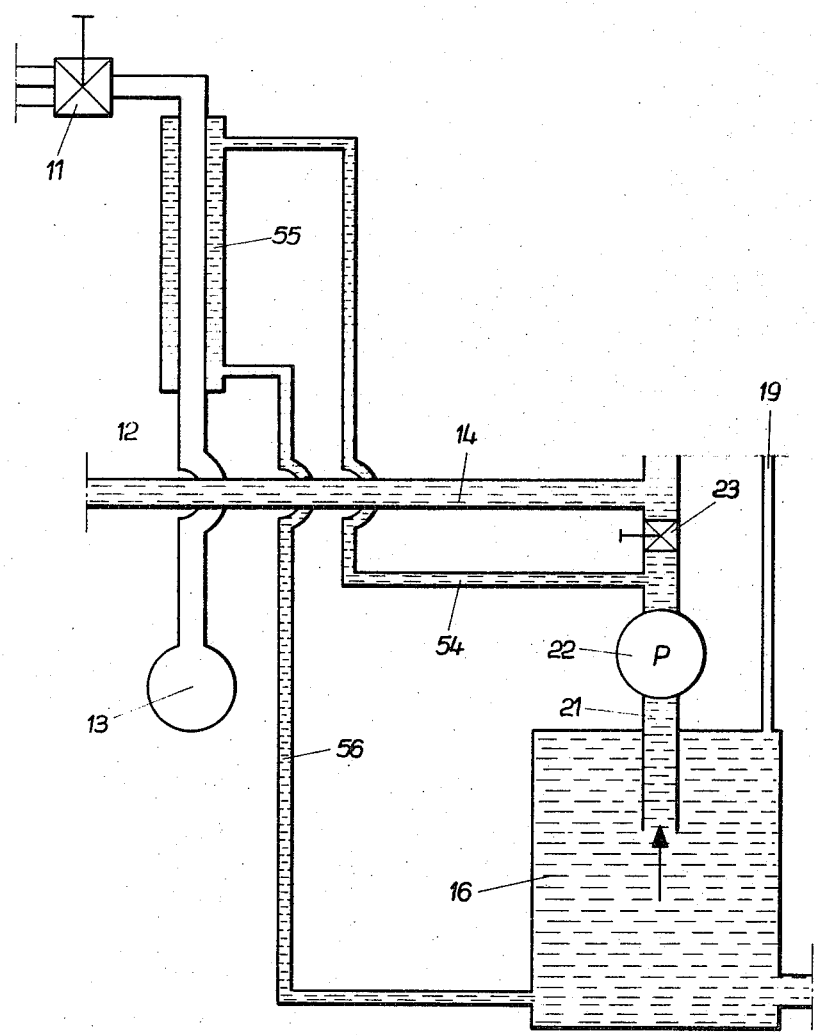
FIG. 5 is a diagrammatic showing of a heating arrangement for the steam supply.

The steam to be injected into the closed mold between the synthetic granules should be, within the scope of the invention, the driest possible steam and at a temperature approximately ranging from 100° to 130°C. FIG. 5 shows one method and apparatus for constant heating of the steam supply line 12 ahead of the valve 11, so that the steam to be introduced in the mold will be maintained at sufficiently high temperatures and avoiding thereby that the adiabatic expansion occurring upon injection into the mold and the corresponding cooling effect will cause any kind of condensation.

A branch line 54 is connected in the illustration of FIG. 5 between pump 22 and valve 23 of heating container 16, leading to a heating jacket 55 surrounding the steam supply line 12. A return flow line 56 runs from the heating jacket 55 to heating container 16. Pump operating continuously, a steady heating stream circulation of heat transfer substance is maintained through heating jacket 55. If the device should be provided with a triplet liquid circulation system, such as shown in FIG. 2 or FIG. 5, the heating stream circulation 54,55,56 of the steam supply line 12 may also be connected correspondingly to the additional heating container 37.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for the manufacture of molded articles of foam-forming synthetic plastics material wherein means is provided for introducing the material to be molded in granular or like fluent condition into a mold central chamber defined by associated shaped mold walls, a first system is provided for the selective application of heating and cooling heat transfer substances to the outer sides of said mold walls, and a separate independent second system is provided for introducing steam into the mold central chamber, wherein at least one of said mold walls is provided on a mold member which has a rear wall spaced from the mold wall so as to define chamber means of said first system therebetween for introduction of heat transfer substances, and said mold member is mounted on a housing the interior of which is part of said second system and is separated into a steam supply chamber and a steam distribution chamber connected by a valved passage, the rear wall of said mold member being attached to said housing to extend over and at least partly close said steam distribution chamber, and a plurality of steam injection passages in said rear wall providing constant fluid communication between said steam distribution chamber and said mold central chamber at predetermined locations.

2. Apparatus as defined in claim 1, wherein valved means is provided for selectively connecting said steam distribution chamber to a source of vacuum.

3. Apparatus as defined in claim 1, wherein valved means is provided for selectively connecting said steam distribution chamber to a source of compressed air.

4. Apparatus as defined in claim 1, wherein said mold member is relatively thin-walled and said housing is relatively sturdy and resistance to deformation by fluid pressure to accurately support said mold member in assembly.

5. Apparatus as defined in claim 1, wherein said first system comprises means for selectively heating and cooling a heat transfer liquid and supplying it in either heated or cooled condition to said mold walls.

6. Apparatus as defined in claim 1, wherein means is provided in said first system for preheating said mold walls in a predetermined temperature range prior to introduction of said material, and for continuing heating of said mold walls at a lower mold operating temperature during the molding operation.

7. Apparatus as defined in claim 1, wherein said valved passage is normally closed by a spring biased valve member, and power means is provided for selectively opening said valve to admit steam into said steam distribution chamber during the foam forming operation.

8. Apparatus as defined in claim 6, wherein said mold walls are of thin material having good heat conductivity, said first system comprises chamber means backing said mold walls and having outer walls of good thermal insulating material.

9. Apparatus as defined in claim 7, wherein said mold walls are metal and said outer chamber walls are a glass fiber reinforced thermosetting synthetic resin.

10. Apparatus as defined in claim 6, wherein the means for heating said heat transfer liquid comprises means for heating said liquid to a relatively high temperature for preheating said mold walls prior to introduction of said synthetic plastics material, and means for heating said liquid to a lower operating temperature during foaming and molding of said material within the mold central chamber.

11. Apparatus as defined in claim 10, wherein said preheating means comprises a reservoir connected in parallel with a reservoir for said lower operating temperature heating means, the outlet of each said reservoir being connected to a common conduit supplying heated liquid to said mold walls, each said outlet containing a valve and a pump for controlling liquid flow to said conduit.

12. Apparatus for the manufacture of molded articles of foam-forming synthetic plastics material wherein means is provided for introducing the material to be molded in granular or like fluent condition into a mold central chamber defined by associated shaped mold walls, a first system is provided for the selective application of heat and cooling heat transfers substances to the outer sides of said mold walls and a separate independent second system is provided for introducing steam into the mold central chamber, wherein said first system comprises a heating liquid reservoir connected by passage means to chamber means backing said mold walls, and said second system comprises a passage connected between a source of steam and said mold central chamber, means for conducting heated liquid from said reservoir as a heating medium through a heating means mounted in heat exchanging relation with said steam passage.

13. Apparatus for the manufacture of molded articles from foam-forming synthetic plastic material, wherein means is provided for introducing the material to be molded in granular or like fluent condition into a mold central chamber defined by associated shaped mold walls, a first system is provided for the selective application of heating and cooling heat transfer substances to the outer sides of said mold walls, and a separate independent second system is provided for introducing steam into the mold central chamber, wherein at least one of said mold walls is provided on a mold member which has a rear wall spaced from the mold wall to define chamber means of said first system therebetween for introduction of heat transfer substances, and said mold member is mounted on a housing the interior of which is part of said second system and contains a steam distribution chamber connected by a valved passage to a steam supply means of said second system, a plurality of steam injection passages in said mold member rear wall providing constant fluid communication between said steam distribution chamber and said mold central chamber at predetermined locations, and wherein means for selectively connecting said steam distribution chamber to a source of vacuum and means for selectively connecting said steam distribution chamber to a source of fluid pressure is provided.

14. Apparatus as defined in claim 13, wherein one of said mold walls is formed on a first mold member containing said steam distribution chamber, and the other one of said mold walls is provided on a second mold member which has a rear wall spaced from the mold wall so as to define chamber means of said first system therebetween for introduction of heat transfer substances, said other member rear wall being attached to a housing have an internal pressure chamber adapted to be connected to a source of fluid pressure, and said other mold member having article ejection passage means extending therethrough between said internal pressure chamber and said mold central chamber.

15. Apparatus for the manufacture of molded articles of foam-forming synthetic plastics material, wherein means is provided for introducing the material to be molded in granular or like fluent condition into a mold central chamber defined by associated shaped mold walls, a first system is provided for the selective application of heating and cooling heat transfer substances to the outer sides of said mold walls, and a separate independent second system is provided for introducing steam into the mold central chamber, wherein the said mold walls are of thin metallic material having good heat conductivity, the said first system comprises chamber means backing said mold walls, said first system and especially said chamber means being adapted for substantially pressure-free transfer of the heating and cooling heat substances, and wherein said chamber means has outer walls of synthetic plastic material having high thermal insulating characteristics, said mold walls being secured to said outer chamber walls.

16. Apparatus as defined in claim 15, wherein said first system comprises chamber means for backing the mold walls and connected for receiving a heat transfer liquid, means providing liquid heating and liquid cooling devices, inlet passage means connecting both of said devices to said chamber means and containing valves for selectively supplying heated or cooled liquid to said chamber means, and return passage means connected between said chamber means and said devices.

17. Apparatus as defined in claim 16, wherein means is provided defining a catching reservoir in the upper part of said liquid cooling device, means connecting said return passage means to discharge into said catching reservoir, means providing a drain outlet for said catching reservoir in fluid communication with said liquid heating device, and means providing an overflow outlet for said catching reservoir permitting overflow into said cooling device.

18. Apparatus as defined in claim 17, wherein a discharge valve controlled outlet is provided in the bottom of said catching reservoir for discharge directly into said cooling device, and temperature responsive means in said return passage means adjacent said catching reservoir for controlling actuation of said discharge valve.

19. Apparatus as defined in claim 16, wherein said liquid cooling device comprises a cooling reservoir connected to said return passage means, and said liquid heating device comprises two liquid heating reservoirs each having a valved outlet selectivey connectible to discharge heated fluid toward said mold walls and means defining a catching reservoir in the upper part of said cooling reservoir connected to receive liquid directly from said return passage, means connecting the outlet of said catching reservoir to each of said liquid heating reservoirs through non-return valves.

20. Apparatus as defined in claim 16, wherein said liquid cooling device comprises a cooling reservoir connected to said return passage means, and said liquid heating device comprises two liquid heating reservoirs each having a valve outlet selectively connectible to discharge heated fluid toward said mold walls, and means defining two vertically spaced catching reservoirs in the upper part of said cooling reservoir, the uppermost of said catching reservoirs being disposed to directly receive liquid from said return passage means and having a bottom valve for discharge into the lowermost catching reservoir, and means connecting the outlets of said catching reservoirs to respective ones of said heating reservoirs.

21. Apparatus for the manufacture of molded articles of foam-forming synthetic plastics material wherein means is provided for introducing the material to be molded in granular or like fluent condition into a mold central chamber defined by associated shaped mold walls, means is provided for injecting steam into the central mold chamber during foam-forming and means is provided for selectively heating and cooling said mold walls, characterized in that a first system is provided for the selective application of heating and cooling heat transfer substances to the outer sides of said mold walls, and a separate independent second system is provided for introducing steam into the mold central chamber, and means in said first system for preheating said mold walls in a predetermined temperature range prior to introduction of said material, and for continuing heating of said mold walls at a lower mold operating temperature during the molding operation, said mold walls being of thin material having good heat conductivity, said first system comprises chamber means backing said mold walls and having outer walls of good thermal insulating material, and said mold walls being of metal and said outer chamber walls being a glass fiber reinforced thermosetting synthetic resin.

22. Apparatus for the manufacture of molded articles of foam-forming synthetic plastics material wherein means is provided for introducing the material to be molded in granular or like fluent condition into a mold central chamber defined by associated shaped mold walls, means is provided for injecting steam into the central mold chamber during foam-forming and means is provided for selectively heating and cooling said mold walls, characterized in that a first system is provided for the selective application of heating and cooling heat transfer substances to the outer sides of said mold walls, and a separate independent second system is provided for introducing steam into the mold central chamber, said first system comprises chamber means for backing the mold walls and connected for receiving a heat transfer liquid, means providing liquid heating and liquid cooling devices, inlet passage means connecting both of said devices to said chamber means and containing valves for selectively supplying heated or cooled liquid to said chamber means, and return passage means connected between said chamber means and said devices, means defining a catching reservoir in the upper part of said liquid cooling device, means connecting said return passage means to discharge into said catching reservoir, means providing a drain outlet for said catching reservoir in fluid communication with said liquid heating device, and means providing an overflow outlet for said catching reservoir permitting overflow into said cooling device.

23. Apparatus for the manufacture of molded articles of foam-forming synthetic plastics material wherein means is provided for introducing the material to be molded in granular or like fluent condition into a mold central chamber defined by associated shaped mold walls, means is provided for injecting steam into the central mold chamber during foam-forming and means is provided for selectively heating and cooling said mold walls, characterized in that a first system is provided for the selective application of heating and cooling heat transfer substances to the outer sides of said mold walls, and a separate independent second system is provided for introducing steam into the mold central chamber, said first system comprises chamber means for backing the mold walls and connected for receiving a heat transfer liquid, means providing liquid heating and liquid cooling devices, inlet passage means connecting both of said devices to said chamber means and containing valves for selectively supplying heated or cooled liquid to said chamber means, and return passage means connected between said chamber means and said devices, said liquid cooling device comprising a cooling reservoir connected to said return passage means, and said liquid heating device comprises two liquid heating reservoirs each having a valved outlet selectively connectible to discharge heated fluid toward said mold walls and means defining a catching reservoir in the upper part of said cooling reservoir connected to receive liquid directly from said return passage, and means connecting the outlet of said catching reservoir to each of said liquid heating reservoirs through nonreturn valves.

24. Apparatus for the manufacture of molded articles of foam-forming synthetic plastics material wherein means is provided for introducing the material to be molded in granular or like fluent condition into a mold central chamber defined by associated shaped mold walls, means is provided for injecting steam into the central mold chamber during foam-forming and means is provided for selectively heating and cooling said mold walls, characterized in that a first system is provided for the selective application of heating and cooling heat transfer substances to the outer sides of said mold walls, and a separate independent second system is provided for introducing steam into the mold central chamber, said first system comprises chamber means for backing the mold walls and connected for receiving a heat transfer liquid, means providing liquid heating and liquid cooling devices, inlet passage means connecting both of said devices to said chamber means and containing valves for selectively supplying heated or cooled liquid to said chamber means, and return passage means connected between said chamber means and said devices, said liquid cooling device comprising a cooling reservoir connected to said return passage means, and said liquid heating device comprises two liquid heating reservoirs each having a valve outlet selectively connectible to discharge heated fluid toward said mold walls, and means defining two vertically spaced catching reservoirs in the upper part of said cooling reservoir, the uppermost of said catching reservoirs being disposed to directly receive liquid from said return passage means and having a bottom valve for discharge into the lowermost catching reservoir, and means connecting the outlets of said catching reservoirs to respective ones of said heating reservoirs.

25. Apparatus for the manufacture of molded articles of foam-forming synthetic plastics material comprising mold walls defining a mold chamber, means for introducing said material in granular or like fluent condition into said chamber, means for introducing steam into said chamber during foam-forming of said material, means independent of said steam introducing means for heating said mold walls at least during foam-forming and for subsequently cooling said mold walls comprising a system wherein a liquid heat transfer substance is applied at a controlled temperature for heating said mold walls and then said substance is cooled and applied to said mold walls after foam-forming.

26. Apparatus as defined in claim 25, wherein said system comprises means whereby heated heat transfer liquid is applied to said mold walls prior to injection of said material for preheating said mold walls and then said mold walls are maintained at said controlled temperature during foam-forming.

* * * * *

UNITED STATES PATENT OFFICE
CERTIFICATE OF CORRECTION

Patent No. 3,837,769  Dated September 24, 1974

Inventor(s) Hans Erlenbach

It is certified that error appears in the above-identified patent and that said Letters Patent are hereby corrected as shown below:

Column 7, line 13, change "vavle" to --valve--

Column 8, line 6, change "these" to --there--

Column 11, line 23, after "be" insert --a--

Column 13, line 51, after "Pump" insert --22--

Column 14, line 35, change "resistance" to --resistant--

Column 15, Claim 14, line 63 change "have" to --having--

Signed and sealed this 24th day of December 1974.

(SEAL)
Attest:

McCOY M. GIBSON JR.
Attesting Officer

C. MARSHALL DANN
Commissioner of Patents